S. L. BLOCHER.
FARM TRACTOR.
APPLICATION FILED MAR. 6, 1917.
1,267,503.
Patented May 28, 1918.
2 SHEETS—SHEET 2.
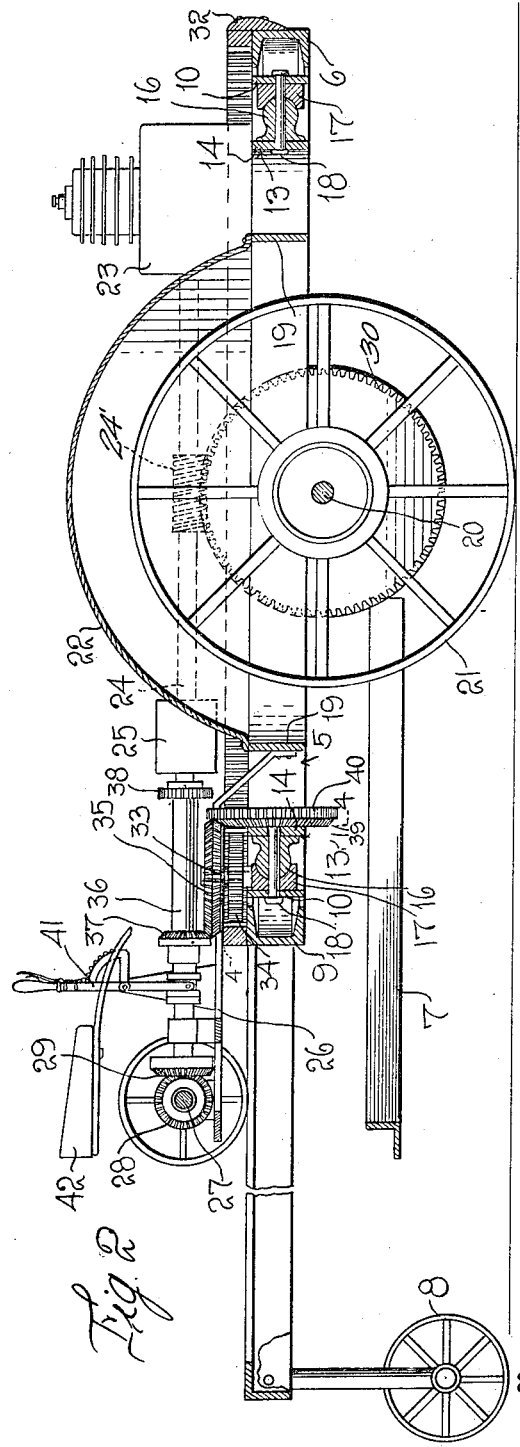
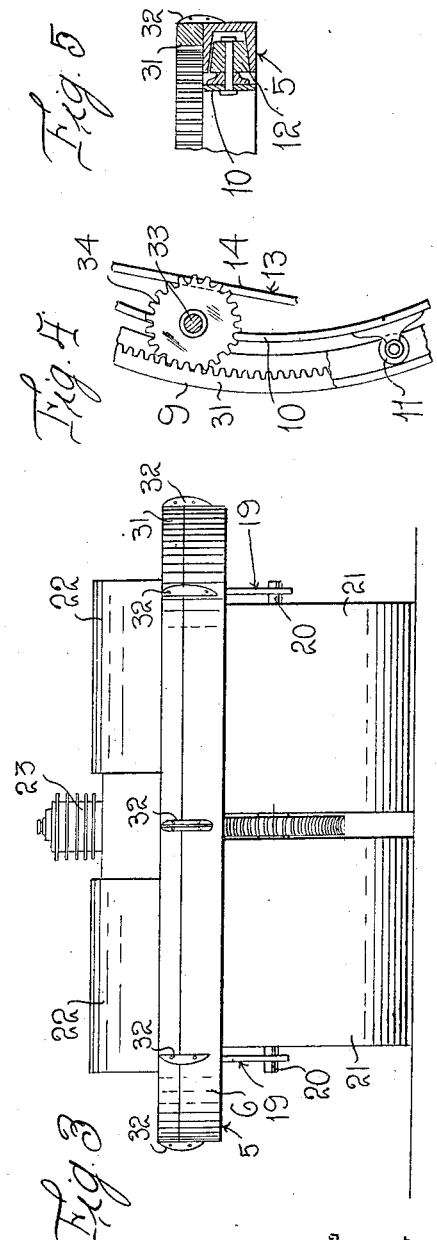
Inventor
SOLOMON L. BLOCHER
By Watson E. Coleman
Attorney

UNITED STATES PATENT OFFICE.

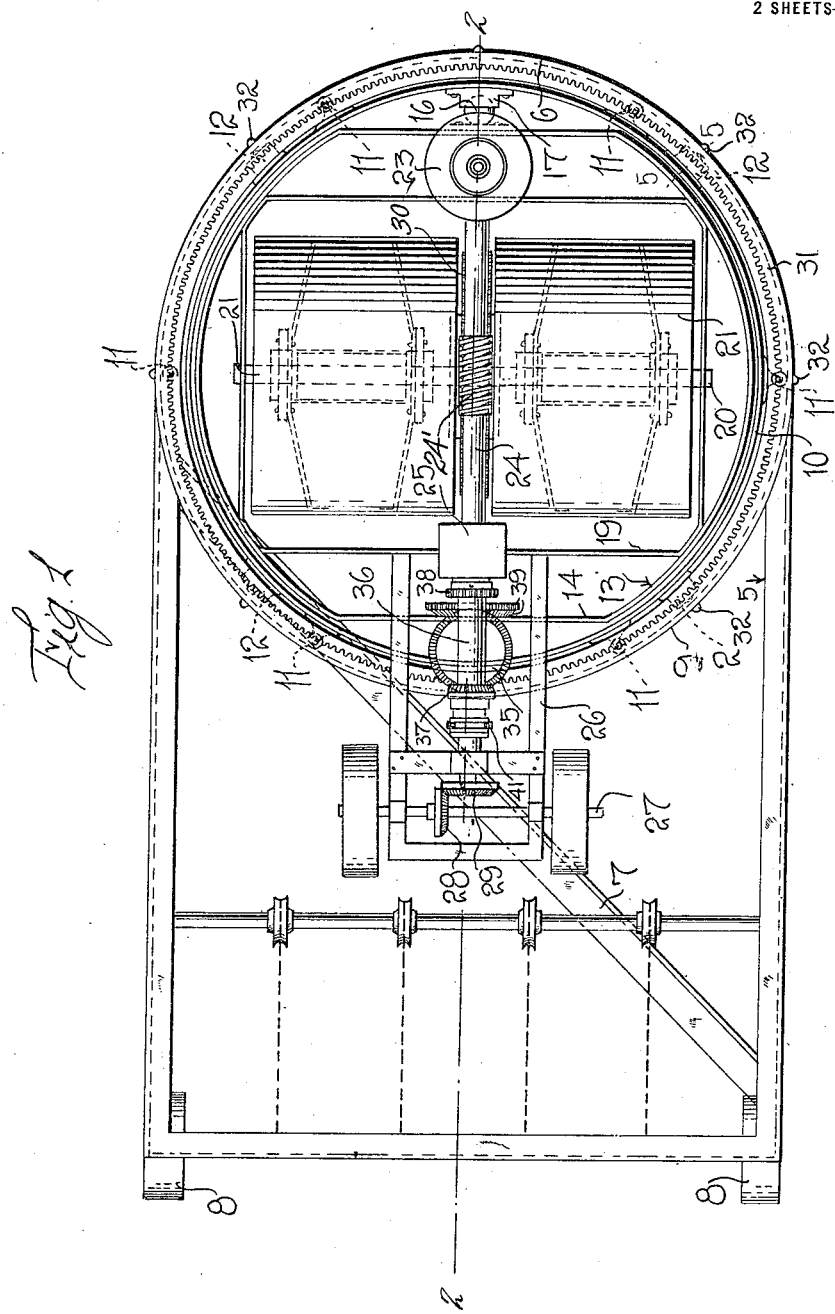

SOLOMON L. BLOCHER, OF PACKERTON, INDIANA.

FARM-TRACTOR.

1,267,503.

Specification of Letters Patent.  Patented May 28, 1918.

Application filed March 6, 1917.  Serial No. 152,769.

*To all whom it may concern:*

Be it known that I, SOLOMON L. BLOCHER, a citizen of the United States, residing at Packerton, in the county of Kosciusko and State of Indiana, have invented certain new and useful Improvements in Farm-Tractors, of which the following is a specification, reference being had to the accompanying drawings.

This invention relates to improvements in farm tractors and has for its primary object to provide a self-propelled vehicle of this type having improved steering means whereby the tractor may be readily turned with respect to the frame of the machine.

It is another object of my invention to provide an improved mounting of the tractor and its frame, whereby the same may oscillate within the main frame of the machine in traveling over rough or uneven ground.

It is also one of the detail objects of the invention to provide an improved mounting or support for the tractor frame within the machine frame so as to permit of the free rotation or turning movement of the tractor and reduce the vertical and transverse strains on the tractor frame to a minimum.

It is also a further general object of my invention to improve and simplify the construction of tractors of the above type, whereby the same are rendered reliable and efficient in practical operation and capable of manufacture at comparatively small cost.

With the above and other objects in view, my invention consists in the novel features of construction, combination and arrangement of parts to be hereinafter more fully described, claimed and illustrated in the accompanying drawings, in which:

Figure 1 is a plan view of my improved farm tractor;

Fig. 2 is a section taken on the line 2—2 of Fig. 1;

Fig. 3 is an end elevation;

Fig. 4 is a section taken on the line 4—4 of Fig. 2; and

Fig. 5 is an enlarged detail section taken on the line 5—5 of Fig. 1.

Referring in detail to the drawing, 5 designates the main frame of the machine which may be of any desired form in plan, but as herein illustrated is of simi-circular form at its forward end, as shown at 6. An obliquely disposed beam 7 is suspended from the side rails of the main frame, to which plows or other implements are adapted to be attached. Casters 8 of any suitable construction support the machine frame at its rear end.

Within the forward end of the frame 5, the channel-shaped track 9 is arranged and suitably secured to the frame. The frame is preferably formed of angle iron and the rounded end portion 6 thereof may constitute a part of this track. A metal ring or annulus 10 is arranged within the track 9 and in spaced concentric relation to its inner open side. A plurality of spaced, horizontally disposed rollers 11 are mounted in suitable bearings fixed to the outer side of this annulus and bear against the inner face of the vertical wall of the track 9. A plurality of vertically disposed rollers 12 are also mounted in the outer face of the annulus 10 and travel between the top and bottom flanges of the track.

Within the annulus 10, a frame 13 is arranged, said frame having portions disposed in concentric relation to the annulus 10 and also provided with parallel, transversely disposed, front and rear portions 14. Upon each of these latter portions of the frame bar 13, a spherical bearing member 16 is rigidly fixed and engaged in a bearing block 17 secured to the inner face of the annulus 10. One end of a bolt 18 is fixed in the bearing 16 and bar 13 and extends loosely through an opening in the block 17 and the annulus 10. Upon the outer end of each of these bolts one of the vertical supporting rollers 12 is rotatably mounted. Within the frame bar 13 and rigidly fixed thereto, the farm tractor supporting frame 19 is rigidly secured. In suitable bearings on the opposite ends of this frame, the ends of the transversely disposed wheel axle or shaft 20 are journaled. This axle is centrally provided with a differential gear mechanism of any well known type, and upon the opposite end portions of the axle, the tractor wheels 21 are secured. The upper portions of these wheels are preferably covered by housings 22 secured to the frame 19.

23 designates the gasolene engine suitably mounted upon the frame bars 14 and 19 at the forward end of the machine, and 24 indicates the rearwardly extending drive shaft, suitable transmission gearing being interposed in said shaft as at 25. The rear portion of this shaft is mounted in suitable bearings on a supporting frame 26 upon which the transversely disposed driven shaft 27 is supported. This shaft carries a bevel gear 28 meshing with a similar gear 29 fixed to the rear end of the shaft 24. The shaft 24 is provided with a worm 24' which meshes with the worm gear 30 of the differential gear mechanism whereby rotation is transmitted to the axles of the ground wheels 21.

Upon the upper edge of the track 9, an internal gear or annulus 31 is mounted and secured by means of the lugs 32 which project downwardly from said annulus upon the outer face of the track 9 and are securely riveted or otherwise fixed thereto. The vertically disposed shaft 33 is suitably mounted upon the annulus 10 and has a pinion 34 fixed thereon meshing with the teeth of the internal gear 31. A double bevel gear 35 is secured upon the upper end of this shaft, said gear having teeth both upon its top and bottom faces as shown. A sleeve 36 is keyed for longitudinal sliding movement upon the shaft 24 and has gears 37 and 38 respectively fixed upon its opposite ends. Upon the inner end of one of the rods 18, a gear wheel is loosely mounted, said wheel having one series of bevel teeth 39 for engagement with the bevel gear teeth on the under side of the gear 35. A second set of gear teeth are provided on the gear mounted on the rod 18 for engagement with the teeth of the gear 38. The sleeve 36 and the gears secured thereto are shifted longitudinally of the shaft 24 by means of a suitable lever indicated at 41 which is mounted adjacent to the operator's seat 42 for convenient operation.

From the above description, the operation of the machine will be readily understood. When it is desired to turn the traction wheels in steering the machine in the proper direction, the operator shifts the sleeve 36 through the medium of the lever 41 in one direction to engage the gear 37 with the teeth on the upper side of the gear 35. Thus, the pinion 34 is rotated and caused to travel upon the teeth of the internal gear 31 so that the annulus 10, the frame 19, and the tractor wheels are turned with respect to the machine frame as will be readily understood. In order to turn the tractor in the opposite direction, the gear 38 is shifted into engagement with the gear teeth 40, and the teeth 39 meshing with the teeth on the under side of the gear 35 rotate the latter gear in an opposite direction and thereby, through the medium of the pinion 34, reversing the rotation of the tractor. Thus, the machine may be readily guided or steered to avoid obstructions in its path and may also be very easily turned when the end of the field is reached. It will be understood that the driving connection to the tractor wheels shown in the accompanying drawing is merely for the purposes of illustration and various other driving means may be substituted therefor. I have also shown in the drawings a beam 7 suspended from the main frame of the machine, to which the plows are adapted to be connected, but as this feature also is merely illustrative of one use of the invention, it is apparent that plows or other implements may be connected to the machine for operation thereby in various other ways. When the machine is operated upon stony or uneven ground, the tractor may rock or oscillate with respect to the rotatable annulus 10 which is mounted upon the track 9, thereby relieving the main frame of the machine of considerable strain.

From the foregoing description, taken in connection with the accompanying drawings, the construction, manner of operation and several advantages of the invention will be clearly and fully understood. I have herein illustrated a very simple construction and arrangement of the several elements which I have found to be highly efficient in practical operation. Such construction is exceedingly durable, light in weight, and not liable to get out of order. The machine may, of course, be constructed in various sizes in accordance with the particular service for which it is to be used. Therefore, while I have herein shown and described the preferred construction and arrangement of the several parts, it is to be understood that the machine is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

In a vehicle of the character described, the combination of a frame having a track at one end, a second frame disposed within said track, tractor wheels rotatably mounted in the second frame, means on the tractor frame co-acting with the main frame to support the latter, driving means mounted upon the tractor frame including a shaft, an internal gear fixed to the track, a vertically disposed shaft mounted upon the tractor frame, a pinion fixed to said shaft meshing with said internal gear, a second gear element fixed on said vertically disposed shaft and having gear teeth on its opposite faces, a vertically rotating gear element mounted upon the tractor frame having teeth meshing with the teeth on one face of the gear element on said vertical shaft, and manually shiftable gears mounted upon the power shaft, one of said gears being adapted for engagement with the gear teeth on the other face of said gear element, said vertically disposed gear element also having a second set of gear teeth to be engaged by the other gear mounted upon the power shaft, whereby said pinion may be rotated in either direction to turn the tractor frame and wheels with respect to the main frame.

In testimony whereof I hereunto affix my signature in the presence of two witnesses.

SOLOMON L. BLOCHER.

Witnesses:
 GEO. F. OGDEN,
 SAMUEL BLOCHER.

Copies of this patent may be obtained for five cents each, by addressing the "Commissioner of Patents. Washington, D. C."